GORDON F. BREWSTER
ROBERT A. WEIDEL
INVENTORS

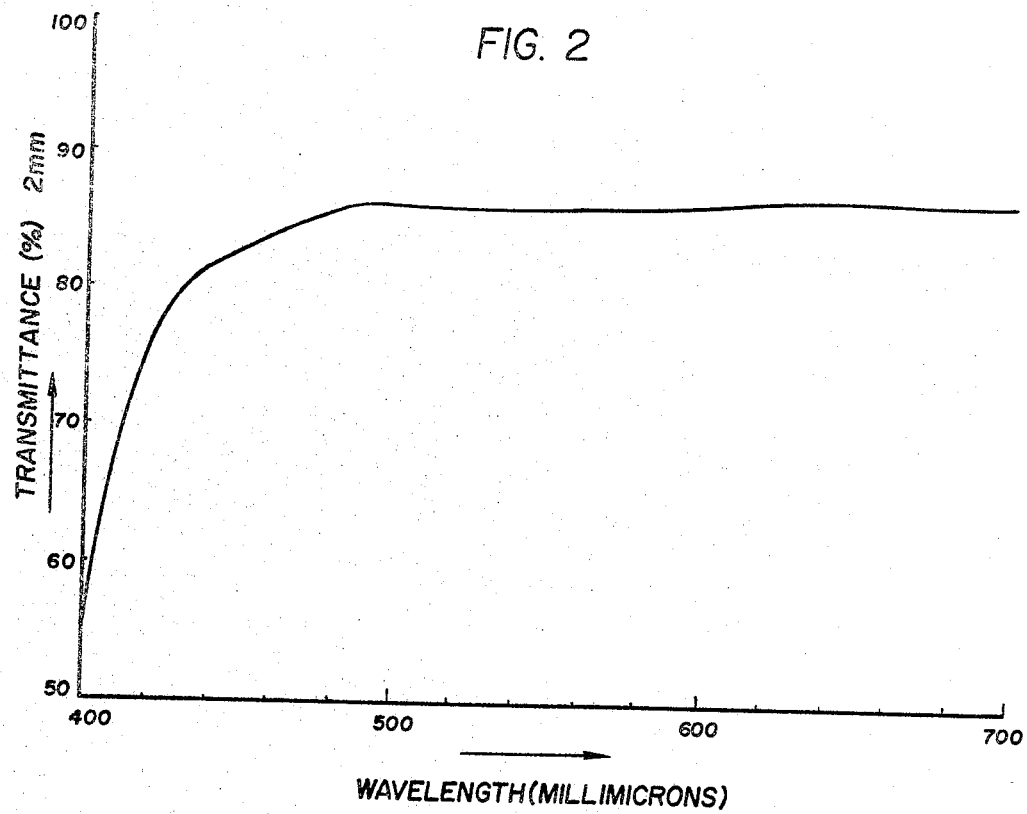

United States Patent Office 3,490,928
Patented Jan. 20, 1970

3,490,928
TITANIUM PHOSPHATE SUPERFLINT GLASS
Gordon F. Brewster, Williamson, and Robert A. Weidel, Webster, N.Y., assignors to Bausch & Lomb Incorporated, Rochester, N.Y., a corporation of New York
Filed Jan. 23, 1967, Ser. No. 610,971
Int. Cl. C03c 3/16, 3/30; G02b 1/00
U.S. Cl. 106—47                                                  9 Claims

ABSTRACT OF THE DISCLOSURE

Optical glass compositions containing glass batch constituents in weight percent ranges: titanium dioxide 7 to 35, alumina 1 to 10, alkali metal oxide 1 to 20, alkaline earth oxide 1 to 10, phosphorous pentoxide 30 to 60, boric oxide 3 to 18, and arsenous oxide 3 to 30. The glasses are useful as optical materials having unusually low Abbe values of less than about 40 and refractive indices ($n_D$) of about 1.6 to 1.75.

DESCRIPTION

Figure 1:
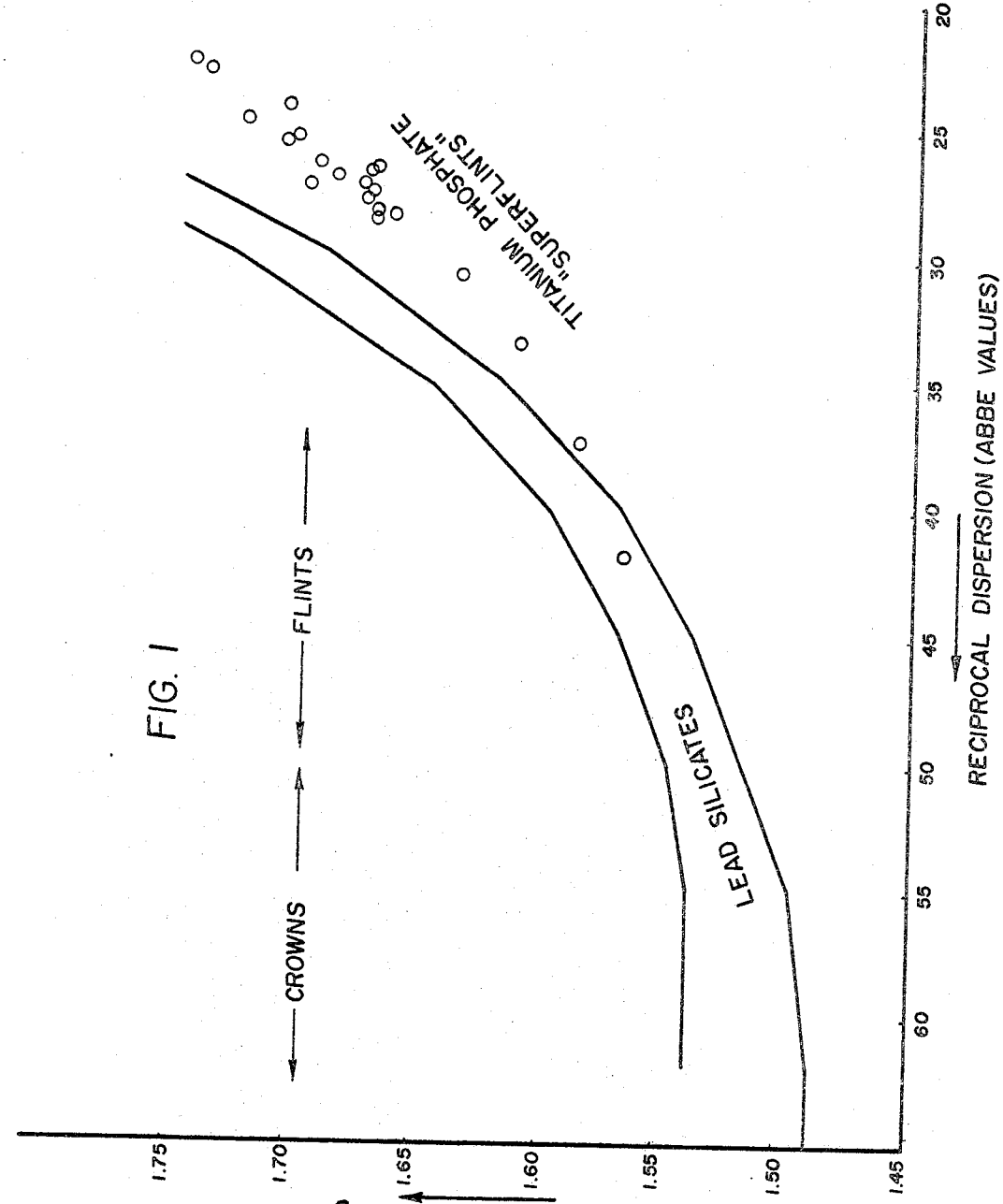

This invention relates to phosphate glasses containing titanium dioxide. Prior glasses containing large amounts of titanium compounds have been characterized by a deep purple color which rendered them unsuitable for many optical uses. It has been discovered that this undesirable property is eliminated by introducing arsenous oxide into the glass batch. The resulting glasses have an acceptable yellow color similar to that of high flint glass and the glass materials can be used in various optical instruments, such as microscopes.

The glass former is, $P_2O_5$ introduced as metaphosphate. Aluminum metaphosphate is desirable since it is the most chemically durable of the metaphosphates, at the same time having a high melting range. Alkali metal metaphosphate is added to lower the melting temperatures of the system and, the alkaline earths are used to adjust other physical and optical properties. Where high amounts of titanium oxide are added to the batch, it has been found necessary to add boric oxide in order to retain the $TiO_2$ in the glass matrix.

In making up the glass batch, it is preferred to add the aluminum, alkaline earth and alkali metal oxides in the form of metaphosphate salts, e.g., $Al(PO_3)_3$, $Mg(PO_3)_2$ and $KPO_3$ because this method for introducing the components results in minimum loss of $P_2O_5$ by volatilization during the melting step. The total amount of the metaphosphates is generally less than 80 weight percent in the batch composition.

Orthophosphates, such as $BPO_4$, may be added to some of the compositions, but these additives require higher melting temperatures, resulting in excessive $As_2O_3$ losses. Also, substantial devitrification of the glass occurs when more than about 3 weight percent of boron orthophosphate is used. Up to 20 weight percent lead metaphosphate is acceptable to achieve certain indices.

Magnesium metaphosphate is the preferred alkaline earth compound, and may be used from about 5 to 40 wt. percent. Calcium and barium oxides may be introduced without detrimental effects up to about 10 weight percent (based on the metaphosphate).

Potassium metaphosphate can be used in wide proportions (about 5 to 35 wt. percent). Other alkali metal compounds containing sodium or lithium may be used in part. For example, up to 20 weight percent $LiPO_3$ may be added to adjust the refractive index and Abbe value of a particular glass.

Aluminum metaphosphate (about 5 to 40 wt. percent) is important to achieve the optimum quality product having high durability and low devitrification properties, when combined with the other constituents. Fairly large amounts of $TiO_2$ can be introduced into the glass matrix in the absence of $B_2O_3$, however, the introduction of boric oxide allows larger amounts of $TiO_2$ to be added and stabilizes (for devitrification) other compositions. Boric oxide is usually added as $B(OH)_3$ in an amount sufficient to give a $TiO_2:B_2O_3$ weight ratio of about 1:1 to 9:1.

Sufficient arsenous oxide is added to the batch to substantially decrease the purple color ordinarily present when titanium oxide is present in the glass. The $TiO_2$:-$As_2O_3$ weight ratio of about 0.8:1 to 10:1 has been satisfactory for eliminating the purple color.

Accordingly, it is an object of this invention to provide new glass compositions having valuable optical properties. Another object is to decrease the purple color of titanium oxide glasses by addition of arsenous oxide to the glass batch. Yet another object is to provide a batch composition of metaphosphate compounds of aluminum, alkali metals and alkaline earth metals containing sufficient boric oxide to permit large amounts of titanium oxide to be retained in the glass, and sufficient arsenous oxide to decrease the color attributed to the presence of titanium oxide. A further object is to provide a high-titania glass useful for optical instruments. These and other objects and features of the invention will be seen in the following description of examples and in the drawing, wherein:

FIG. 1 is a graphic plot of the refractive index and Abbe value for several titanium phosphate "superflint" glasses, comparing these properties with known optical materials; and FIG. 2 is a graphic plot of radiation transmittance showing its change with wavelength in the visible region of the electromagnetic spectrum.

The results of numerous glass melts have been tabulated to show the effect of titania and arsenous oxide on the optical properties of the glass. In Table I, the refractive index is shown for the sodium D line (589.29 millimicrons) and the reciprocal dispersion is expressed as the Abbe value ($\nu = n_D - 1 n_F - n_C$, where $n_F$ and $n_C$ are the refractive indices for 486.13 and 656.29 millimicrons, respectively).

TABLE I

| Example No. | Batch Constituents, Weight Percent | | | | | | Optical Properties | |
|---|---|---|---|---|---|---|---|---|
| | Al(PO₃)₃ | Mg(PO₃)₂ | KPO₃ | B₂O₃ | TiO₂ | As₂O₃ | Refractive index ($n_D$) | Abbe Values ($\nu$) |
| 1 | 36.5 | 12.7 | 17.8 | 7.5 | 22.2 | 3.3 | 1.6698 | 27.2 |
| 2 | 36.2 | 12.6 | 17.6 | 6.2 | 22.0 | 5.5 | 1.6739 | 26.6 |
| 3 | 34.7 | 11.7 | 16.3 | 4.9 | 27.0 | 5.4 | 1.7090 | 24.2 |
| 4 | 32.5 | 11.2 | 15.7 | 4.9 | 32.5 | 3.2 | 1.7410 | 22.8 |
| 5 | 32.2 | 11.1 | 15.5 | 3.6 | 32.2 | 5.4 | 1.7475 | 22.4 |
| 6 | 9.0 | 27.8 | 29.6 | 6.2 | 22.0 | 5.5 | 1.6768 | 27.2 |
| 7 | 18.0 | 12.6 | 35.8 | 6.2 | 22.0 | 5.5 | 1.6753 | 26.8 |
| 8 | 20.0 | 32.8 | 19.6 | 6.2 | 16.0 | 5.5 | 1.6367 | 30.8 |
| 9 | 21.0 | 33.8 | 20.6 | 6.2 | 13.0 | 5.5 | 1.6138 | 33.5 |
| 10 | 22.0 | 34.8 | 21.6 | 6.2 | 10.0 | 5.5 | 1.5890 | 37.4 |
| 11 | 23.0 | 35.8 | 22.6 | 6.2 | 7.0 | 5.5 | 1.5682 | 42.2 |
| 12 | 17.0 | 29.8 | 16.6 | 9.2 | 22.0 | 5.5 | 1.6748 | 27.6 |
| 13 | 16.0 | 28.8 | 15.6 | 12.2 | 22.0 | 5.5 | 1.6767 | 27.9 |
| 14 | 15.0 | 27.8 | 14.6 | 15.2 | 22.0 | 5.5 | 1.6727 | 28.3 |
| 15 | 16.0 | 28.8 | 15.6 | 6.2 | 22.0 | 11.5 | 1.6955 | 26.4 |
| 16 | 15.0 | 27.8 | 14.6 | 6.2 | 22.0 | 14.5 | 1.7015 | 26.0 |
| 17 | 14.0 | 26.8 | 13.6 | 6.2 | 22.0 | 17.5 | 1.7104 | 25.6 |
| 18 | 13.0 | 25.8 | 12.6 | 6.2 | 22.0 | 20.5 | 1.7191 | 25.1 |
| 19 | 12.0 | 24.8 | 11.6 | 6.2 | 22.0 | 23.5 | 1.7261 | 24.8 |
| 20 | 11.0 | 23.8 | 10.6 | 6.2 | 22.0 | 26.5 | 1.7049 | 25.4 |
| 21 | 18.0 | 30.8 | 17.6 | 6.2 | 22.0 | 5.5 | 1.6886 | 27.0 |
| 22 | 19.0 | 31.8 | 18.6 | 6.2 | 19.0 | 5.5 | 1.6639 | 28.5 |
| 23 | 18.0 | 30.8 | 17.6 | 7.2 | 20.0 | 6.5 | 1.6718 | 28.6 |

The titanium phosphate "superflints" shown in Example Nos. 1 to 23 of Table I, have been plotted with respect to their optical properties in FIG. 1. These glasses display an Abbe value ($\nu$) lower than other flint glasses for a given refractive index, and this property is extremely valuable in providing design flexibility for the optical designer.

The relative proportions of the batch constituents can be varied widely to produce the desired glass product. The limits of oxide percentages in the glass are shown in Table II for the individual compounds. This tabulation shows the broad, preferred and optimum percentages of each oxide, independently of the particular combination of oxides (e.g., metaphosphates) which make up the batch.

TABLE II

| Glass Component | Weight Range (percent) | | |
|---|---|---|---|
| | Broad | Preferred | Optimum |
| Al₂O₃ | 1–10 | 2–7 | 3–4 |
| Alk. earth oxide | 1–10 | 2–8 | 5–7 |
| Alk. metal oxide | 1–20 | 4–15 | 5–10 |
| P₂O₅ | 30–60 | 40–55 | 45–55 |
| B₂O₃ | 3–18 | 4–15 | 5–8 |
| TiO₂ | 7–35 | 8.5–25 | 12–22 |
| As₂O₃ | 3–30 | 4–7 | 5–6 |

| | Weight Ratio | | |
|---|---|---|---|
| TiO₂:B₂O₃ | 1–9 | | |
| TiO₂:As₂O₃ | 0.8–10 | | |

The glass of Example 22 is typical of the titanium phosphate "superflints" in its heating schedule to convert the batch constituents to a glassy reaction product. For a ten-pound melt, the mixed batch particles are filled over a period of three hours into a platinum melting pot at 1200° C. The melt is fined and stirred for about 19 hours at 1230° C., and cooled in 1.5 hours to 1150° C. At this temperature, the molten material is cast on a mold preheated to 300–400° C. Then the cast glass is annealed for about 12 to 20 hours at 550° C. Variations in the schedule for a particular melt size or composition will be readily determined by a skilled glassmaker. When large amounts of arsenous oxide are included in the melt, some loss due to volatility can be expected. However, this can be minimized by using relatively low melting temperatures.

The titanium phosphate "superflint" of Example 22 is a preferred embodiment of the invention, and caries an I.C.T. designation of Type 664/285. Its yellow color is comparable to very high flint glasses. As shown in FIG. 2, the transmittance decreases with shorter wavelength toward the ultraviolet region of the electromagnetic spectrum, typical of flints. Above about 500 millimicrons, the transmittance is nearly constant.

Table III shows the results of highly-accurate refractive index measurements for the Type 664/285 glass of Example 22.

TABLE III

| Wavelength (millimicrons): | Refractive index |
|---|---|
| 434.047 | 1.695818 |
| 435.833 | 1.695178 |
| 486.133 | 1.680730 |
| 508.582 | 1.676001 |
| 546.073 | 1.669617 |
| 587.562 | 1.664146 |
| 589.294 | 1.663935 |
| 643.847 | 1.658489 |
| 656.285 | 1.657454 |

$$\nu = 28.5243$$

The cold working properties of the titanium phophate "superflints" are normal, and the glass reacts well to grinding, polishing, sawing and other similar operations.

Various glass modifiers may be added to the new glasses within the skill of the glassmaking art without departing from the inventive concept.

What is claimed is:

1. A glass composition consisting essentially of TiO₂, P₂O₅, Al₂O₃, alkaline earth oxide, alkali metal oxide, B₂O₃ and As₂O₃, the glass having a refractive index ($n_D$) of about 1.6 to 1.75 and Abbe value ($\nu$) less than about 40 wherein the glass batch constituents are present in the following weight percent ranges:
   Al₂O₃, 1 to 10;
   alkaline earth oxide, 1 to 10;
   alkali metal oxide, 1 to 20;
   P₂O₅, 30 to 60;
   B₂O₃, 3 to 18;
   TiO₂, 7 to 35; and
   As₂O₃, 3 to 30.

2. A glass composition consisting essentially of TiO₂, P₂O₅, Al₂O₃, alkaline earth oxide, alkali metal oxide, B₂O₃ and As₂O₃, the glass having a refractive index ($n_D$) of about 1.6 to 1.75 and Abbe value ($\nu$) less than about 40 wherein the glass batch constituents are present in the following weight percent ranges:
   Al₂O₃, 2 to 7;
   alkaline earth oxide, 2 to 8;
   alkali metal oxide, 4 to 15;
   P₂O₅, 40 to 55;
   B₂O₃, 4 to 15;
   TiO₂, 8.5 to 25; and
   As₂O₃, 4 to 7.

3. A glass composition consisting essentially of $TiO_2$, $P_2O_5$, $Al_2O_3$, alkaline earth oxide, alkali metal oxide, $B_2O_3$ and $As_2O_3$, the glass having a refractive index ($n_D$) of about 1.6 to 1.75 and Abbe value ($\nu$) less than about 40 wherein the glass batch constituents are present in the following weight percent ranges:

$Al_2O_3$, 3 to 4
alkaline earth oxide, 5 to 7;
alkali metal oxide, 5 to 10;
$P_2O_5$, 45 to 55;
$B_2O_3$, 5 to 8;
$TiO_2$, 12 to 22 and
$As_2O_3$, 5 to 6.

4. A glass composition consisting essentially of $TiO_2$, $P_2O_5$, $Al_2O_3$, alkaline earth oxide, alkali metal oxide, $B_2O_3$ and $As_2O_3$, the glass having a refractive index ($n_D$) of about 1.6 to 1.75 and Abbe value ($\nu$) less than about 40 wherein the glass batch constituents consist essentially of:

aluminum metaphosphate, magnesium metaphosphate, potassium metaphosphate, containing 1 to 10 weight percent, aluminum oxide, 1 to 10 percent magnesium oxide, 1 to 20 percent potassium oxide, and 30 to 60 percent phosphorus pentoxide;
3 to 18 percent boric oxide;
7 to 35 percent titanium dioxide; and
3 to 30 percent arsenous oxide.

5. A glass composition consisting essentially of $TiO_2$, $P_2O_5$, $Al_2O_3$, alkaline earth oxide, alkali metal oxide, $B_2O_3$ and $As_2O_3$, the glass having a refractive index ($n_D$) of about 1.6 to 1.75 and Abbe value ($\nu$) less than about 40 wherein the glass batch constituents consist essentially of: about 19.0 weight percent $Al(PO_3)_3$, 31.8 percent $Mg(PO_3)_2$, 18.6 percent $KPO_3$, 6.2 percent $B_2O_3$, 19.0 percent $TiO_2$, 5.5 percent $As_2O_3$.

6. The glass composition of claim 5 having refractive index ($n_D$) of about 1.66 and Abbe value ($\nu$) of about 28.5.

7. A glass batch composition consisting essentially of:

1 to 10 weight percent $Al_2O_3$,
1 to 10 percent MgO,
1 to 20 percent $K_2O$,
30 to 60 percent $P_2O_5$,
3 to 18 percent $B_2O_3$,
7 to 35 percent $TiO_2$, and
3 to 30 percent $As_2O_3$.

8. The glass batch composition of claim 7 consisting essentially of:

2 to 7 percent $Al_2O_3$,
2 to 8 percent MgO,
4 to 15 percent $K_2O$,
40 to 55 percent $P_2O_5$,
4 to 15 percent $B_2O_3$,
8.5 to 25 percent $TiO_2$, and
4 to 7 percent $As_2O_3$.

9. The glass batch composition of claim 7 consisting essentially of:

3 to 4 percent $Al_2O_3$,
5 to 7 percent MgO,
5 to 10 percent $K_2O$,
45 to 55 percent $P_2O_5$,
5 to 8 percent $B_2O_3$,
12 to 22 percent $TiO_2$, and
5 to 6 percent $As_2O_3$.

References Cited

UNITED STATES PATENTS

| | | | |
|---|---|---|---|
| 2,999,819 | 9/1961 | Blair | 106—47 X |
| 3,068,108 | 12/1962 | Geffcken | 106—47 |
| 3,100,714 | 8/1963 | Brömer et al. | 106—47 X |
| 3,328,181 | 6/1967 | Weidel | 106—47 |

FOREIGN PATENTS 1,003,926   3/1957   Germany.

JAMES E. POER, Primary Examiner

W. R. SATTERFIELD, Assistant Examiner